(12) United States Patent
Mizuno et al.

(10) Patent No.: US 11,648,574 B2
(45) Date of Patent: May 16, 2023

(54) SPRAY CHAMBER, SAMPLE ATOMIZATION AND INTRODUCTION DEVICE, ANALYSIS DEVICE, AND METHOD OF ANALYZING COMPONENT IN SAMPLE

(71) Applicant: SUMCO CORPORATION, Tokyo (JP)

(72) Inventors: Taisuke Mizuno, Saga (JP); Kazumi Inagaki, Ibaraki (JP); Shin-ichiro Fujii, Ibaraki (JP)

(73) Assignee: SUMCO CORPORATION, Tokyo (JP)

( * ) Notice: Subject to any disclaimer, the term of this patent is extended or adjusted under 35 U.S.C. 154(b) by 172 days.

(21) Appl. No.: 16/611,334

(22) PCT Filed: Apr. 24, 2018

(86) PCT No.: PCT/JP2018/016508
§ 371 (c)(1),
(2) Date: Nov. 6, 2019

(87) PCT Pub. No.: WO2018/207606
PCT Pub. Date: Nov. 15, 2018

(65) Prior Publication Data
US 2020/0078806 A1    Mar. 12, 2020

(30) Foreign Application Priority Data

May 12, 2017   (JP) ............................. JP2017-095156

(51) Int. Cl.
*B05B 7/24*      (2006.01)
*H01J 49/04*    (2006.01)
*H01J 49/10*    (2006.01)

(52) U.S. Cl.
CPC .......... *B05B 7/2408* (2013.01); *B05B 7/2497* (2013.01); *H01J 49/045* (2013.01);
(Continued)

(58) Field of Classification Search
CPC ... B05B 7/2408; B05B 7/2497; B05B 7/2424; H01J 49/04; H01J 49/0445; H01J 49/105; H01J 49/165; H01J 49/167
See application file for complete search history.

(56) References Cited

U.S. PATENT DOCUMENTS 5,477,048 A * 12/1995 Nakagawa ............ H01J 49/105
                                                     250/281
5,969,352 A * 10/1999 French .................. H01J 49/105
                                                     250/288

(Continued)

FOREIGN PATENT DOCUMENTS

CN       2619257         6/2004
CN    103515184 A       1/2014
(Continued)

OTHER PUBLICATIONS

International Search Report issued in International Patent Application No. PCT/JP2018/016508, dated Jul. 17, 2018; and English-language translation thereof.

(Continued)

*Primary Examiner* — David E Smith
(74) *Attorney, Agent, or Firm* — Greenblum & Bernstein, P.L.C.

(57) ABSTRACT

Provided is a spray chamber including a sample introduction port portion into which a gas flow containing sample droplets that have been atomized by a nebulizer is introduced, a discharge port portion that discharges at least a part of the gas flow introduced into the sample introduction port portion to the outside, and a flow passage tube portion that has the sample introduction port portion on one end portion thereof and the discharge port portion on the other end portion thereof and serves as a flow passage for the introduced gas flow, wherein the flow passage tube portion includes a first tube portion having the discharge port portion on one end (Continued)

portion thereof and a second tube portion having the sample introduction port portion on one end portion thereof, the spray chamber includes a double tube portion.

17 Claims, 7 Drawing Sheets

(52) U.S. Cl.
CPC ........ *H01J 49/0445* (2013.01); *H01J 49/105* (2013.01); *B05B 7/2424* (2013.01)

(56) References Cited

U.S. PATENT DOCUMENTS

| | | | | |
|---|---|---|---|---|
| 6,177,669 | B1 * | 1/2001 | Wells | H01J 49/165 250/288 |
| 9,186,607 | B1 * | 11/2015 | Wiederin | B01D 50/20 |
| 10,147,592 | B2 * | 12/2018 | Stephan | H01J 49/167 |
| 2013/0181126 | A1 * | 7/2013 | Jong | H01J 49/105 73/864.81 |
| 2015/0122991 | A1 | 5/2015 | Jong | |
| 2017/0098532 | A1 | 4/2017 | Jong | |

FOREIGN PATENT DOCUMENTS

| | | |
|---|---|---|
| CN | 204429018 | 7/2015 |
| CN | 105929012 A | 9/2016 |
| EP | 0358212 A2 | 3/1990 |
| JP | 6-102249 | 4/1994 |
| JP | 9-159610 | 6/1997 |
| JP | 11-326165 | 11/1999 |
| JP | 2001-507449 | 6/2001 |
| JP | 2001-343361 A | 12/2001 |
| JP | 2008-157895 | 7/2008 |
| WO | 98/29896 | 7/1998 |

OTHER PUBLICATIONS

Office Action issued in Taiwanese Patent Appl. No. 107115728, dated Mar. 11, 2019.
Written Opinion of the International Searching Authority issued in International Patent Application No. PCT/JP2018/016508, dated Jul. 17, 2018; and English-language translation thereof.
International Preliminary Report on Patentability for International Patent Application No. PCT/JP2018/016508, dated Nov. 12, 2019; and English-language translation thereof.
Office Action for KR App. No. 10-2019-7034069, dated Nov. 5, 2020 (w/ translation).
Office Action for KR App. No. 10-2019-7034069, dated May 18, 2021 (w/ translation).
Office Action for CN App. No. 201880030245.5, dated Aug. 23, 2021 (w/ translation).

* cited by examiner

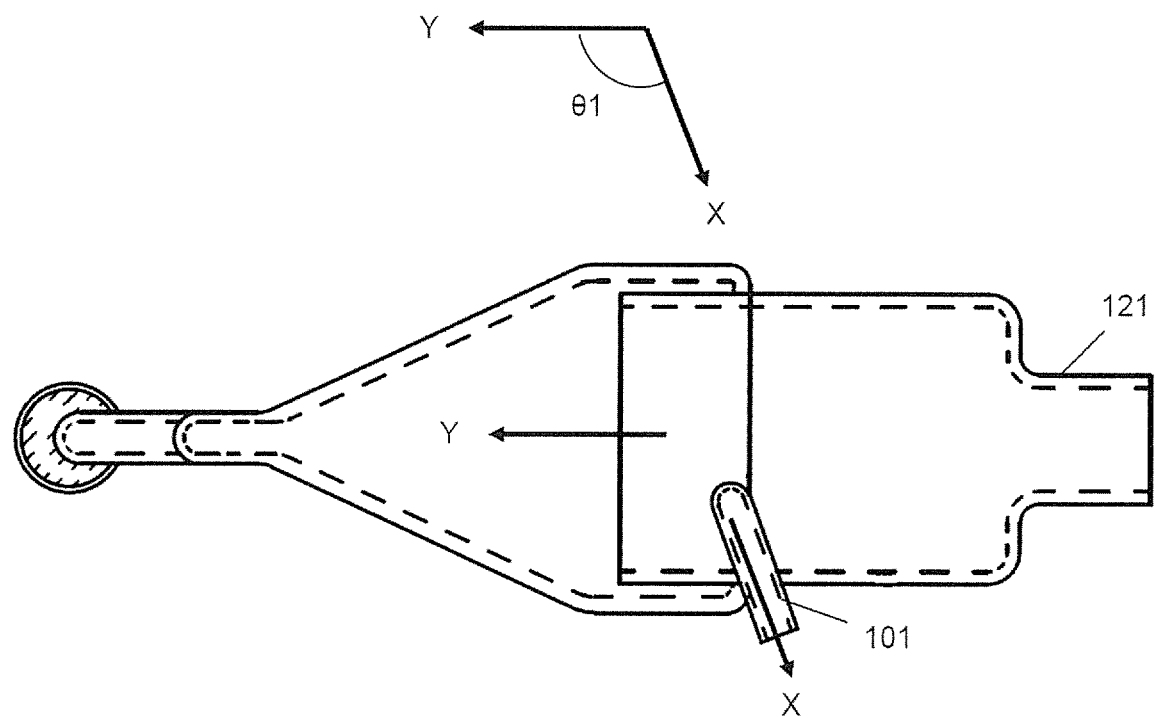

SPRAY CHAMBER, SAMPLE ATOMIZATION AND INTRODUCTION DEVICE, ANALYSIS DEVICE, AND METHOD OF ANALYZING COMPONENT IN SAMPLE

CROSS-REFERENCE TO RELATED APPLICATIONS

This application claims the benefit of priority to Japanese Patent Application No. 2017-095156 filed on May 12, 2017, which is expressly incorporated herein by reference in its entirety.

TECHNICAL FIELD

The present invention relates to a spray chamber, a sample atomization and introduction device, an analysis device, and a method of analyzing components in a sample.

BACKGROUND ART

A sample atomization and introduction device having a nebulizer (an atomizer) and a spray chamber is provided in various types of analysis devices to atomize a sample liquid and introduce the atomized sample liquid into an analysis unit in the form of droplets (see, for example, Japanese Patent Application Publication No. H06-102249, which is expressly incorporated herein by reference in its entirety).

SUMMARY OF INVENTION

In the sample atomization and introduction device described above, the sample liquid is formed into droplets in the nebulizer. The spray chamber, meanwhile, is capable of functioning to sort the sample droplets into particle sizes. More specifically, the spray chamber is mainly capable of functioning to sort the sample droplets into particle sizes corresponding to gravity differences using weight differences generated by differences in the particle sizes of the droplets, and to introduce fine droplets into the analysis unit of the analysis device.

The analysis sensitivity (the signal intensity, for example) in the analysis unit of an analysis device having the sample atomization and introduction device described above and an analysis unit is generally commensurate with the sample introduction efficiency. To improve the analysis sensitivity, therefore, it is desirable to reduce sample droplet loss in the spray chamber so that more droplets are introduced into the analysis unit.

An aspect of the present invention provides for novel means enabling an improvement in the sensitivity of an analysis device that introduces droplets of the sample therein and analyzes the sample.

One aspect of the present invention relates to a spray chamber including:

a sample introduction port portion into which a gas flow containing sample droplets that have been atomized by a nebulizer is introduced;

a discharge port portion that discharges at least a part of the gas flow introduced into the sample introduction port portion to the outside; and a flow passage tube portion that has the sample introduction port portion on one end portion thereof and the discharge port portion on the other end portion thereof and serves as a flow passage for the introduced gas flow, wherein the flow passage tube portion includes a first tube portion having the discharge port portion on one end portion thereof and a second tube portion having the sample introduction port portion on one end portion thereof, the first tube portion has a cylindrical portion that includes an opposite end portion to the end portion having the discharge port portion, and a conical portion with an inner diameter that decreases gradually toward the side of the discharge port portion, the second tube portion has a cylindrical portion that includes an opposite end portion to the end portion having the sample introduction port portion, an outer diameter of the cylindrical portion of the second tube portion being smaller than an inner diameter of the cylindrical portion of the first tube portion, the spray chamber includes a double tube portion formed by overlapping at least a part of the cylindrical portion of the first tube portion and the cylindrical portion of the second tube portion, and an outside side face of the double tube portion is provided with an additional gas introduction opening and an additional gas introduction tube portion that serves as an introduction passage for introducing an additional gas into the double tube portion through the additional gas introduction opening.

In one embodiment, an angle formed by a central axis direction of the additional gas introduction tube portion and a central axis direction of the cylindrical portion of the first tube portion can be within a range of 90° to 130°.

In one embodiment, the additional gas introduction opening can be positioned in a position on the outside side face of the double tube portion closer to the second tube portion.

In one embodiment, a length of the double tube portion can be within a range of 10.0 mm to 30.0 mm.

In one embodiment, a difference between the inner diameter of the cylindrical portion of the first tube portion and the outer diameter of the cylindrical portion of the second tube portion can be within a range of 1.0 mm to 6.0 mm.

In one embodiment, a ratio (length/maximum inner diameter) of a length of the conical portion of the first tube portion to a maximum inner diameter of the conical portion can be within a range of 0.5 to 3.0.

In one embodiment, an overall length of the spray chamber can be within a range of 80.0 mm to 200.0 mm.

In one embodiment, an angle formed between a central axis direction of the sample introduction port portion and the central axis direction of the cylindrical portion of the first tube portion can be within a range of 10° to 60°.

In one embodiment, the central axis direction of the sample introduction port portion and the central axis direction of the cylindrical portion of the first tube portion can be identical directions.

In one embodiment, the first tube portion and the second tube portion can be members made of glass, quartz, or a fluorine resin.

In one embodiment, the outside side face of the double tube portion can be provided with a waste liquid opening and a waste liquid tube portion that serves as a waste liquid passage for discharging waste liquid to the outside from the double tube portion through the waste liquid opening.

Another aspect of the present invention relates to a sample atomization and introduction device including the spray chamber described above and a nebulizer.

A further aspect of the present invention relates to an analysis device including the sample atomization and introduction device described above and an analysis unit.

In one embodiment, an angle formed by a horizontal direction of an arrangement surface on which the sample atomization and introduction device is arranged and the central axis direction of the cylindrical portion of the first tube portion of the spray chamber can be within a range of 20° to 90°.

In one embodiment, the analysis device can be an inductively coupled plasma analysis device, and the analysis unit can include a plasma torch.

In one embodiment, the analysis device can be an inductively coupled plasma mass spectrometry device.

A further aspect of the present invention relates to a method of analyzing a component in a sample liquid, including analyzing a component in an analysis subject sample liquid with the analysis device described above, and further including introducing an additional gas from the additional gas introduction tube portion when a gas flow containing droplets of the sample liquid atomized by the nebulizer flows through the flow passage tube portion of the spray chamber.

According to an aspect of the present invention, a spray chamber that can contribute to an improvement in the sensitivity of an analysis device can be provided.

Further, according to an aspect of the present invention, a sample atomization and introduction device including the above spray chamber, an analysis device including the sample atomization and introduction device, and a method of analyzing the component in a sample liquid using the analysis device can be provided.

BRIEF DESCRIPTION OF DRAWINGS

FIG. 4A is a schematic view (a top view) showing another example of the spray chamber according to one aspect of the present invention.

DESCRIPTION OF EMBODIMENTS

Exemplary aspects illustrated in the figures will be described below on the basis of the figures. The present invention is not limited to the aspects illustrated in the figures.

[Spray Chamber]

A spray chamber according to one aspect of the present invention includes a sample introduction port portion into which a gas flow containing sample droplets that have been atomized by a nebulizer is introduced, a discharge port portion that discharges at least a part of the gas flow introduced into the sample introduction port portion to the outside, and a flow passage tube portion that has the sample introduction port portion on one end portion thereof and the discharge port portion on the other end portion thereof and serves as a flow passage for the introduced gas flow. The flow passage tube portion includes a first tube portion having the discharge port portion on one end portion thereof and a second tube portion having the sample introduction port portion on one end portion thereof. The first tube portion has a cylindrical portion that includes an opposite end portion to the end portion having the discharge port portion, and a conical portion with an inner diameter that decreases gradually toward the side of the discharge port portion. The second tube portion has a cylindrical portion that includes an opposite end portion to the end portion having the sample introduction port portion. Note that an outer diameter of the cylindrical portion of the second tube portion is smaller than an inner diameter of the cylindrical portion of the first tube portion. The spray chamber includes a double tube portion formed by overlapping at least a part of the cylindrical portion of the first tube portion and the cylindrical portion of the second tube portion, and an outside side face of the double tube portion is provided with an additional gas introduction opening and an additional gas introduction tube portion that serves as an introduction passage for introducing an additional gas into the double tube portion through the additional gas introduction opening.

The above spray chamber will be described in further detail below.

First, a conventionally employed spray chamber will be described.

Figure 5:
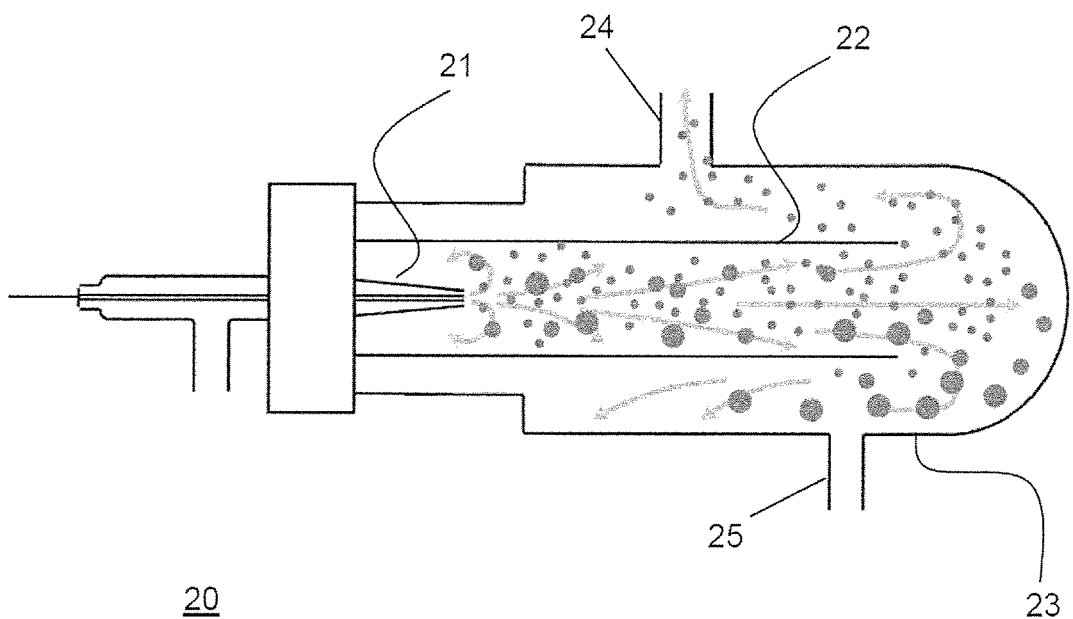
FIG. 5 is a schematic view (a side view) showing an example of a Scott-type spray chamber used widely as a spray chamber of an inductively coupled plasma analysis device.

FIG. 5 is a schematic view (a side view) showing an example of a Scott-type spray chamber used widely as a spray chamber of an inductively coupled plasma analysis device.

In a Scott-type spray chamber (a Scott double pass spray chamber) 20 shown in FIG. 5, sample droplets generated by atomizing a sample liquid in a nebulizer 21 are introduced together with a carrier gas as a gas flow. The Scott-type spray chamber 20 is a tubular member in which the entire spray chamber has a double tube structure, and the gas flow containing the sample droplets is introduced into an inner tube 22 of the double tube from the nebulizer. In the spray chamber 20, droplets having a small particle size and droplets having a large particle size are sorted according to gravity difference using differences in the weight of the droplets generated by differences in the particle size of the droplets. The droplets having a small particle size pass through an outer tube 23 of the double tube so as to be discharged from the top of the spray chamber (through a discharge port 24 in the embodiment shown in FIG. 5), and are then introduced into an analysis unit. The droplets having a large particle size, meanwhile, drop down through the spray chamber, and in the embodiment shown in FIG. 5, are discharged to the outside of the spray chamber as waste liquid through a waste liquid port 25 provided in the bottom of the spray chamber.

In a Scott-type spray chamber such as that described above, a flow passage for the gas flow containing the sample droplets is typically longer than that of other types of spray chambers, and therefore a Scott-type spray chamber is said to exhibit a high ability to sort particle sizes on the basis of gravity differences. However, in a Scott-type spray chamber such as that described above and other conventional spray chambers, droplets adhere to interior wall surfaces of the spray chamber, causing wall surface adhesion loss of the droplets to occur, and this is assumed to lead to a reduction in the efficiency at which the sample is introduced into the analysis unit.

In contrast, in the spray chamber according to one aspect of the present invention described above, the additional gas introduced from the double tube portion can contribute to a reduction in wall surface adhesion loss of the sample droplets. More specifically, the additional gas introduced into the double tube portion can generate an additional gas flow that swirls in a spiral shape around the wall surface from the double tube portion toward the conical portion of the first tube portion, and this additional gas flow can function both to suppress adhesion of the droplets to the wall surface and to pick up the sample droplets and guide the sample droplets to the discharge port. As a result, wall surface adhesion loss of the sample droplets can be reduced.

The spray chamber according to one aspect of the present invention will be described in further detail below.

Figure 1:
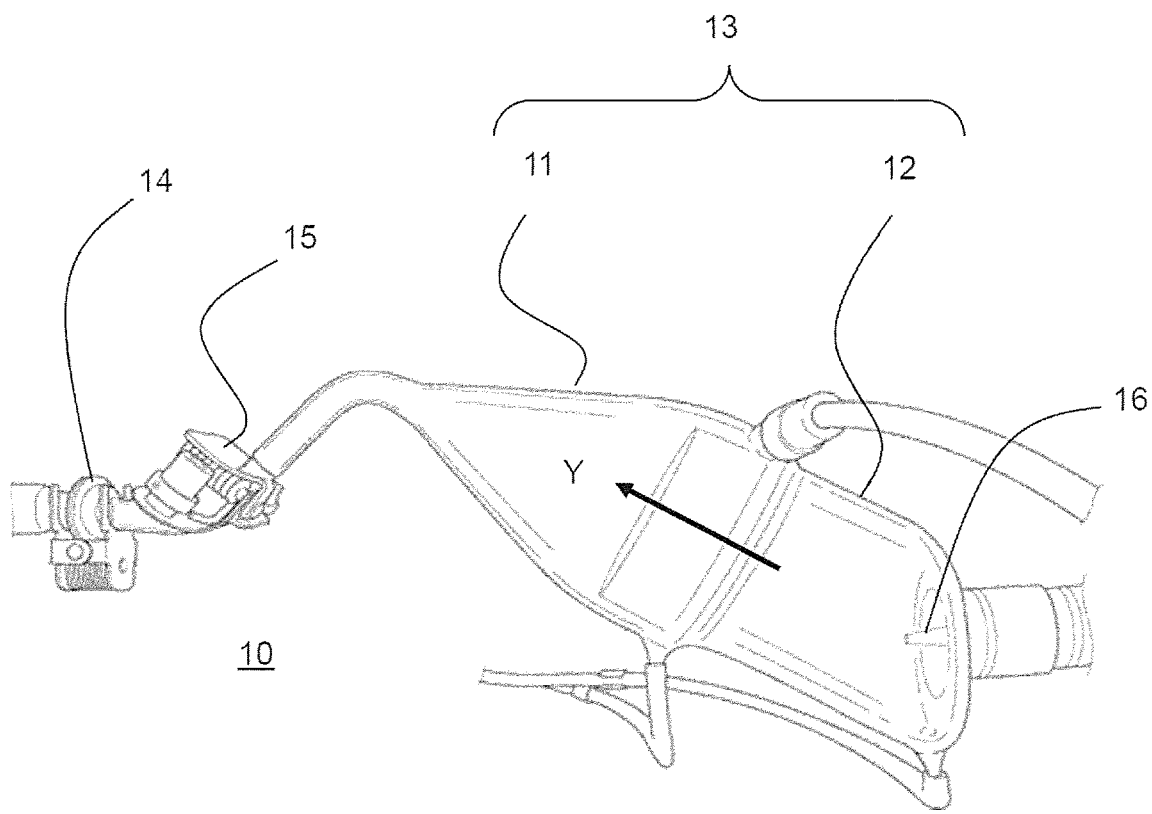
FIG. 1 is a schematic view (a side view) showing an example of a spray chamber according to one aspect of the present invention.
Figure 1:
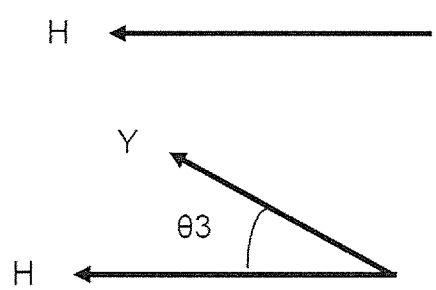

FIG. 1 is a schematic view (a side view) showing an example of the spray chamber according to one aspect of the present invention. A spray chamber 10 shown in FIG. 1 is constituted by a flow passage tube portion 13 including a first tube portion 11 and a second tube portion 12. In the spray chamber 10 of the embodiment shown in FIG. 1, the first tube portion 11 is connected to an analysis unit, to be described in detail below. More specifically, the first tube portion 11 is connected to an inlet portion 14 of a plasma torch, which is a part of the analysis unit positioned closest toward the spray chamber side, via a joint member 15. Further, in the spray chamber 10 of the embodiment shown in FIG. 1, the second tube portion 12 is connected to a nebulizer 16. Furthermore, FIGS. 2A and 2B are schematic views showing the spray chamber alone. FIG. 2A is a top view and FIG. 2B is a side view. Note that in the figures, dotted lines denote thicknesses and not double tubes.

The spray chamber 10 shown in FIGS. 2A and 2B is constituted by the flow passage tube portion 13, which includes a discharge port portion 110 on one end portion thereof and a sample introduction port portion 121 on the other end portion thereof. The flow passage tube portion 13 is constituted by the first tube portion 11 and the second tube portion 12. The first tube portion 11 is constituted by the discharge port portion 110, a conical portion 111, and a cylindrical portion 112. The second tube portion 12, meanwhile, is constituted by a cylindrical portion 120 and the sample introduction tube portion 121. By overlapping and coupling at least a part of the cylindrical portion 112 of the first tube portion 11 and the cylindrical portion 120 of the second tube portion 12, a double tube portion 100 is formed. Hence, an inside wall surface of a space inside the double tube of the double tube portion 100 is an outside side face of the cylindrical portion 120 of the second tube portion 12, and an outside wall surface of the space inside the double tube of the double tube portion 100 is a wall surface of the cylindrical portion 112 of the first tube portion 11.

Next, the first tube portion and the second tube portion will be described in further detail.

In FIGS. 2A and 2B, the first tube portion 11 includes the discharge port portion 110 on one end portion thereof, and the discharge port portion 110 communicates with the conical portion 111. The conical portion 111 has a conical shape with an inner diameter that decreases gradually toward the discharge port portion side. The cylindrical portion 112, including the other end portion of the first tube portion, communicates with the conical portion 111.

In the second tube portion 12, meanwhile, the cylindrical portion 120, which includes one end portion of the second tube portion, communicates with the sample introduction port portion 121, which includes the other end portion.

The flow passage tube portion 13 is constituted by the first tube portion 11 and the second tube portion 12 having the structures described above. Further, in a connecting portion between the first tube portion 11 and the second tube portion 12, the cylindrical portions of the respective tube portions overlap so as to form the double tube portion 100. The double tube portion is the part between an end portion opening of the cylindrical portion of the first tube portion and an end portion opening of the cylindrical portion of the second tube portion. Hence, the respective ends of the double tube portion are open, but an imaginary plane surrounded by the openings will be referred to hereafter as a bottom surface. In the embodiment shown in FIGS. 2A and 2B, the first tube portion 11 and the second tube portion 12 are separate members, and the flow passage tube portion 13 is formed by inserting the cylindrical portion 120 of the second tube portion 12 into the end portion opening of the cylindrical portion 112 of the first tube portion 11 so as to connect the two tube portions. For example, by forming the cylindrical portion 112 of the first tube portion 11 in a tapered shape at the end portion thereof and forming an inner diameter of the tapered end portion opening in a substantially identical shape to an outer diameter of the end portion opening of the cylindrical portion 120 of the second tube portion 12, leakage of the additional gas introduced into the double tube portion 100 formed by connecting the two tube portions to the outside through the connecting portion between the two tube portions can be suppressed. Alternatively, air-tightness can be secured in the connecting portion using a sealing member or the like. Note that as regards the air-tightness of the connecting portion, additional gas leakage does not have to be prevented entirely, and leakage that does not impede the flow of a gas flow formed by the additional gas introduced into the double tube portion is permitted. Alternatively, the flow passage tube portion can be formed by molding the first tube portion and the second tube portion integrally.

The double tube portion 100 has an opening in the outside side face, or more specifically, the outside side face of the cylindrical portion 112 of the first tube portion 11. This opening is an opening (an additional gas introduction opening) for introducing the additional gas into the double tube portion (i.e., the space surrounded by the inside wall surface and the outside wall surface of the double tube portion). An additional gas introduction tube portion 101 serves as an introduction passage for introducing the additional gas into the double tube portion through the above opening. By introducing the additional gas into the double tube portion from the additional gas introduction tube portion through the opening, the introduced additional gas can swirl around the double tube portion so as to generate a gas flow (an additional gas flow) that travels in a spiral shape toward the conical portion 111 of the first tube portion 11. The existence of the conical portion having an inner diameter that gradually decreases toward the discharge port portion side of the spray chamber can also contribute to the formation of a spiral gas flow from the additional gas flow. The additional gas flow generated in this manner can form a gas flow that travels around the wall surface of the conical portion toward the discharge port portion in a spiral shape. By means of this additional gas flow, adhesion of the sample droplets to the wall surface of the conical portion can be suppressed, and moreover, the additional gas flow can pick up the sample droplets and guide the sample droplets to the discharge port portion.

Figure 2A:
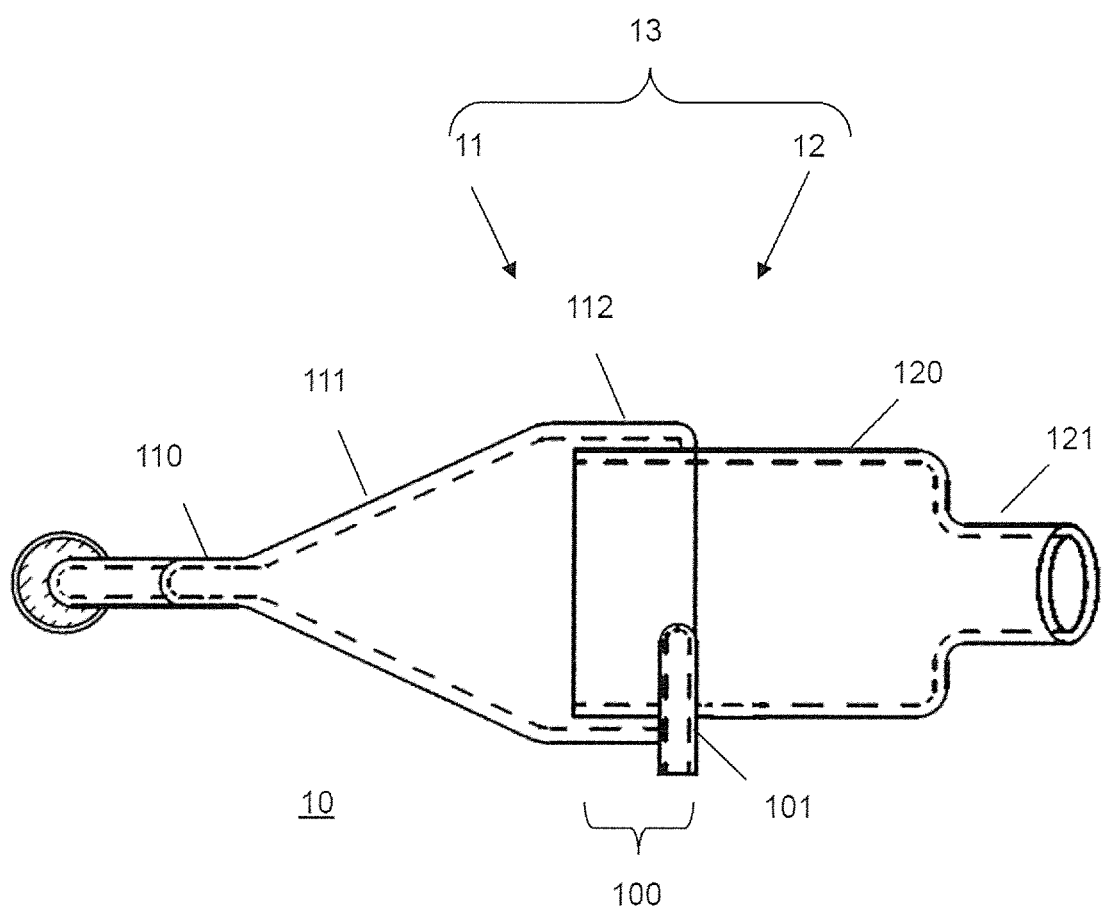
FIG. 2A is a schematic view (a top view) showing an example of the spray chamber according to one aspect of the present invention.
Figure 2B:
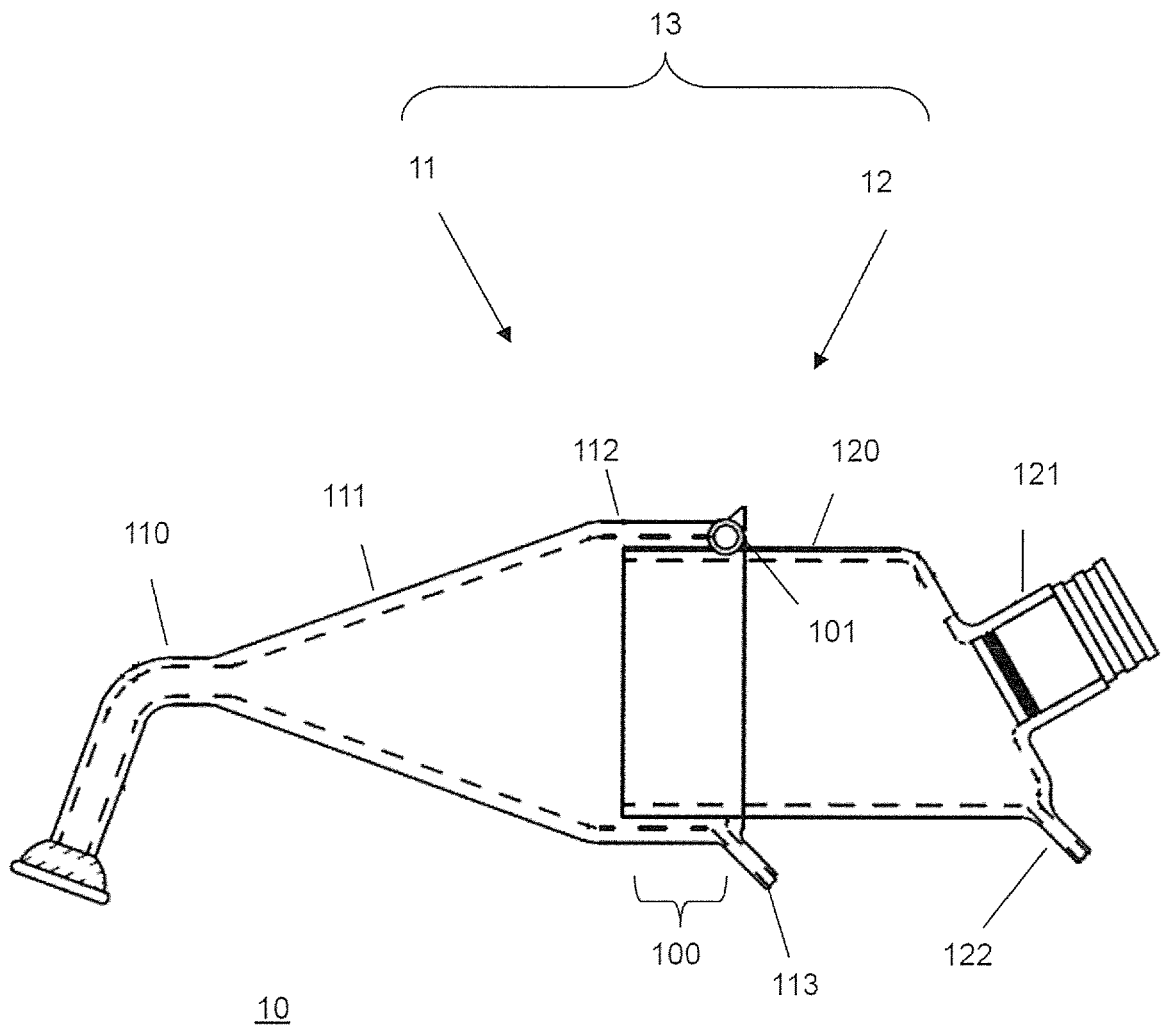
FIG. 2B is a schematic view (a side view) showing an example of the spray chamber according to one aspect of the present invention.

In the embodiment shown in FIGS. 2A and 2B, the cylindrical portion 112 of the first tube portion 11 includes a waste liquid opening provided separately to the additional gas introduction opening, and a waste liquid tube portion 113 for discharging waste liquid through the waste liquid opening. The waste liquid tube portion 113 is capable of functioning as a waste liquid passage for discharging waste liquid to the outside from the interior of the double tube portion 100. Further, in the embodiment shown in FIGS. 2A and 2B, the second tube portion 12 also includes a waste liquid tube portion 122. The waste liquid tube portion 122 is capable of functioning as a waste liquid passage for discharging waste liquid to the outside from the interior of the second tube portion 12.

Next, the respective parts of the spray chamber will be described in further detail.

Figure 3A:
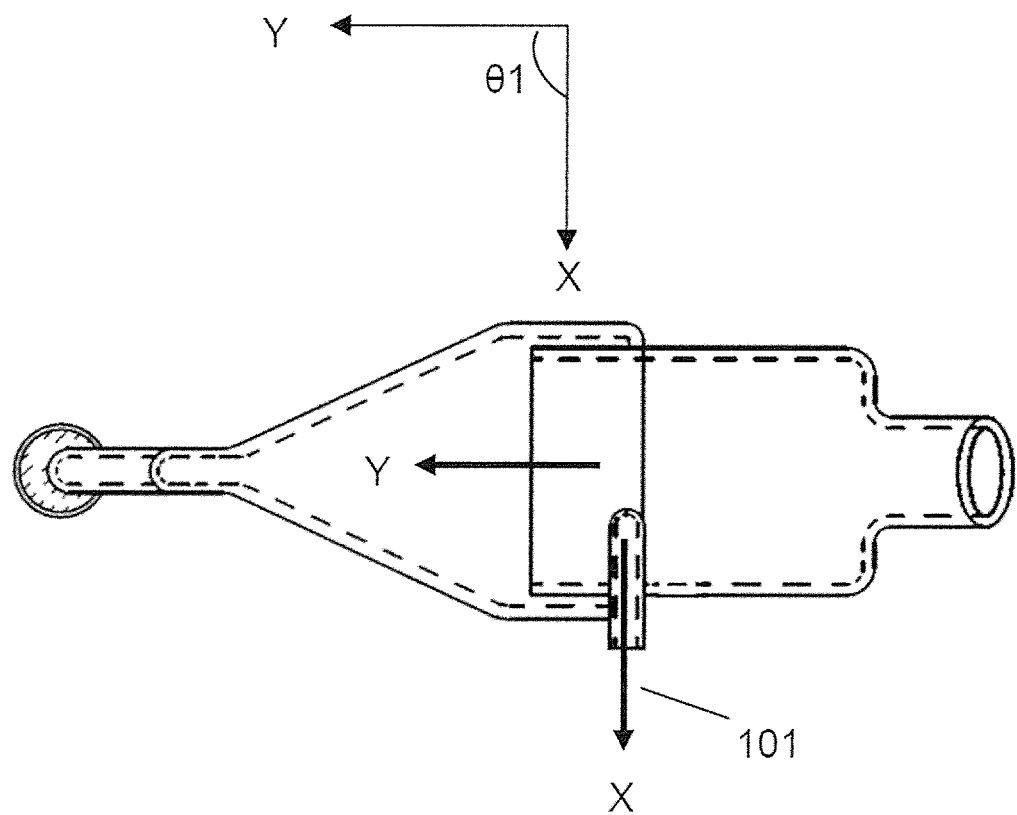
FIG. 3A is an illustrative view of an arrangement of an additional gas introduction tube portion in the spray chamber shown in FIGS. 2A and 2B.
Figure 3B:
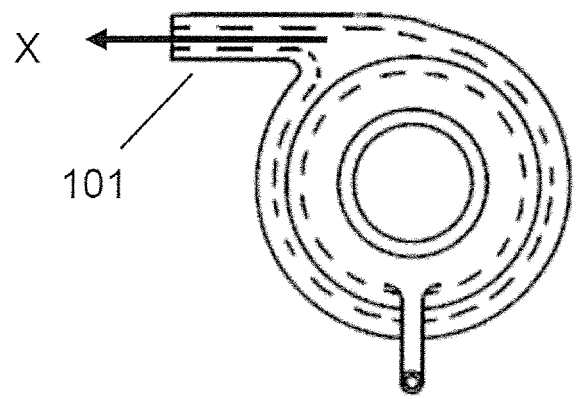
FIG. 3B is an illustrative view of the arrangement of the additional gas introduction tube portion in the spray chamber shown in FIGS. 2A and 2B.
Figure 3C:
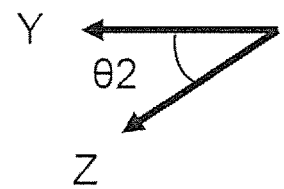
FIG. 3C is an illustrative view of the arrangement of the additional gas introduction tube portion in the spray chamber shown in FIGS. 2A and 2B.
Figure 3C:
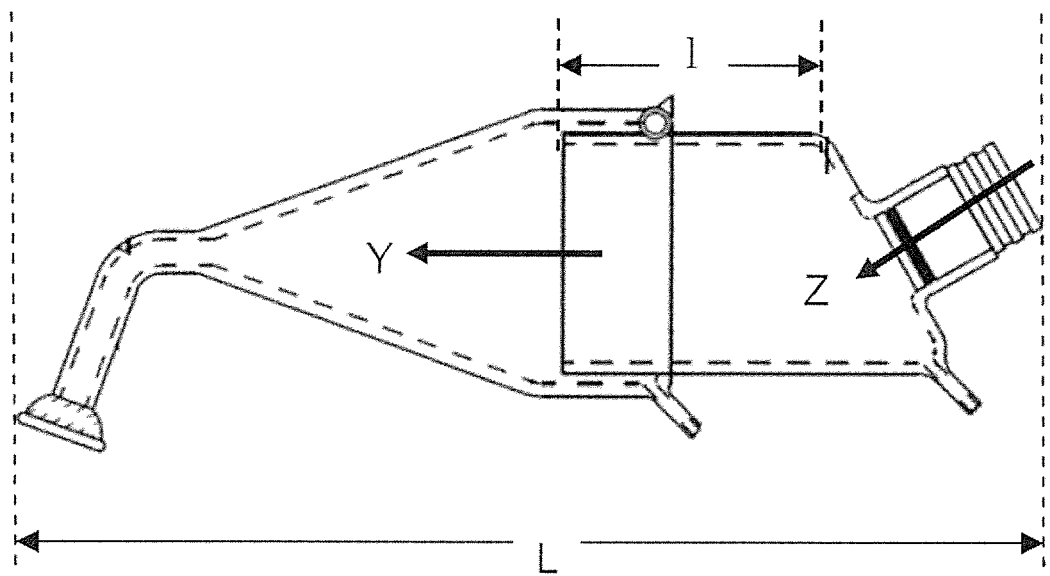

FIGS. 3A to 3C are illustrative views of an arrangement of the additional gas introduction tube portion in the spray chamber shown in FIGS. 2A and 2B. FIG. 3A is a view in which illustrative arrows are drawn on the top view shown in FIG. 2A, and FIG. 3B is a sectional view of the part of the double tube portion that includes the additional gas introduction tube portion. FIG. 3C is a view in which illustrative arrows are drawn on the side view shown in FIG. 2B. The arrows in the figures respectively denote the following directions. An X direction is a central axis direction of the additional gas introduction tube portion. A Y direction is a central axis direction of the cylindrical portion of the first tube portion, and is aligned with a central axis direction of the conical portion of the first tube portion and a central axis direction of the cylindrical portion of the second tube portion. The Y direction is also aligned with a central axis direction of the flow passage tube portion. A Z direction is a central axis direction of the introduction tube portion.

Figure 4B:
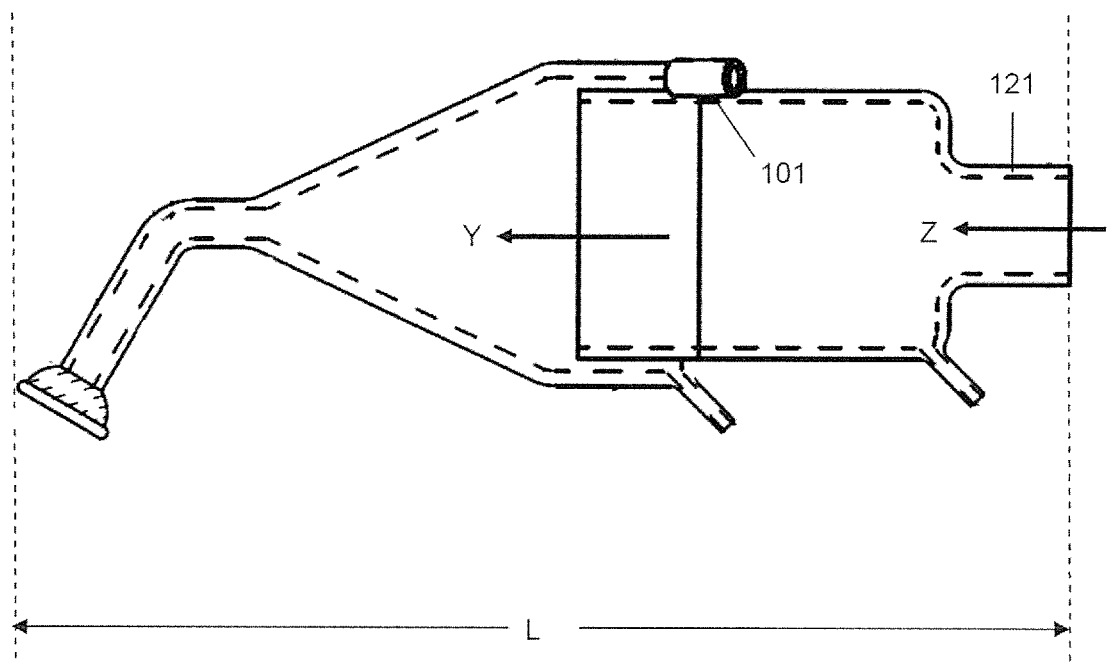
FIG. 4B is a schematic view (a side view) showing another example of the spray chamber according to one aspect of the present invention.

FIGS. 4A and 4B are, respectively, a top view and a side view showing a spray chamber according to another embodiment. The embodiment shown in FIGS. 4A and 4B differs from the spray chamber shown in FIGS. 1 to 3C only in the arrangement of the additional gas introduction tube portion 101 and the sample introduction port portion 121. Description of similarities between the two embodiments has been omitted.

An angle θ1 formed by the X direction and the Y direction is 90° in the embodiment shown in FIGS. 3A to 3C and 110° in the embodiment shown in FIGS. 4A and 4B. The angle θ1 is prescribed within a range of 0° to 180°. To ensure that the gas flow of the additional gas introduced through the additional gas introduction tube portion swirls smoothly around the double tube portion, the angle θ1 is preferably within a range of 90° to 130°. Further, the additional gas introduction opening can be provided in any desired position in the outside side face of the double tube portion. For example, using the center of the outside side face of the double tube portion as a reference, the additional gas introduction opening can be provided in a position closer to the second tube portion, a position closer to the first tube portion, or a position in which the center of the additional gas introduction opening is aligned with the center of the outside side face of the double tube portion. To ensure that the gas flow of the additional gas introduced through the additional gas introduction tube portion swirls smoothly around the double tube portion, the additional gas introduction opening is preferably provided in a position on the outside side face of the double tube portion that is closer to the second tube portion, and the closer the additional gas introduction opening is to the second tube portion, the better.

To ensure that the gas flow of the additional gas introduced through the additional gas introduction tube portion swirls smoothly around the double tube portion, the length of the double tube portion, or more specifically, the shortest distance between the bottom surface on the first tube portion side and the bottom surface on the second tube portion side, is preferably within a range of 10.0 mm to 30.0 mm. Further, the diameter of the additional gas introduction opening is preferably within a range of 0.1 to 3.0 mm. Note that this applies likewise to the diameter of the waste liquid opening.

In the first tube portion, the conical portion is the part positioned between the cylindrical portion and the discharge port portion, in which the inner diameter gradually decreases toward the side of the discharge port portion. In the first tube portion, a position where the inner diameter starts to vary from the cylindrical portion side toward the discharge port portion side is set as a first end portion of the conical portion, and a position where the inner diameter stops varying is set as a second end portion of the conical portion. The shortest distance from the first end portion to the second end portion of the conical portion will be referred to as the length of the conical portion. From the viewpoint of reducing wall surface adhesion loss of the sample droplets in the conical portion, a ratio (length/maximum inner diameter) of the length of the conical portion to the maximum inner diameter of the conical portion is preferably at least 0.3. By setting this ratio at 0.3 or more (more preferably 0.5 or more and even more preferably 0.8 or more), the gas flow of the additional gas in the conical portion can be caused to swirl in a spiral shape more smoothly. Further, as the ratio increases, this means that the length of the conical portion relative to the maximum inner diameter of the conical portion increases. The ratio can be set at 4.0 or less or 3.5 or less, for example. However, as the length of the conical portion increases, leading to a corresponding increase in the ratio, the overall length of the spray chamber increases, leading to an increase in the size of the spray chamber. Meanwhile, the present inventors observed no further variation in the analysis sensitivity when the conical portion was lengthened beyond the point at which the ratio exceeded 3.0. Therefore, from the viewpoint of realizing both an improvement in the analysis sensitivity and a reduction in the size of the spray chamber, the ratio is preferably set at or below 3.0.

The maximum inner diameter of the conical portion of the first tube portion is preferably within a range of 25.0 to 65.0 mm, for example. The maximum inner diameter of the conical portion denotes the inner diameter of the cylindrical portion communicating with the conical portion. As noted above, the cylindrical portion can be formed in a tapered shape at the end portion thereof. In this case, the inner diameter of the cylindrical portion refers to the maximum inner diameter of the cylindrical portion. Further, the minimum inner diameter of the conical portion of the first tube portion is preferably within a range of 5.0 to 10.0 mm, for example. The shape of a cross-section passing through the central axis of the conical portion does not necessarily have to form a part of a perfect triangle, and at least a part of this cross-sectional shape may include a curve.

In the spray chamber described above, the outer diameter of the cylindrical portion of the second tube portion is smaller than the inner diameter of the cylindrical portion of the first tube portion. As a result, the double tube portion can be formed by overlapping at least a part of the cylindrical portion of the first tube portion and the cylindrical portion of the second tube portion. A difference between the inner diameter of the cylindrical portion of the first tube portion and the outer diameter of the cylindrical portion of the second tube portion is preferably within a range of 1.0 mm to 6.0 mm. As long as this difference is within a range of 1.0 mm to 6.0 mm, the width of a space within the double tube portion that is surrounded by the wall surface of the cylindrical portion of the first tube portion and the outside side face of the cylindrical portion of the second tube portion, or in other words, the space into which the additional gas is introduced, can be set within a range of 0.5 mm to 3.0 mm. The width of this space is preferably 0.5 mm or more in order to facilitate the discharge of waste liquid from the double tube portion. Further, the width of this space is preferably 3.0 mm or less to ensure that the gas flow of the additional gas introduced through the additional gas introduction tube portion swirls smoothly around the double tube portion. As an example, the inner diameter of the cylindrical portion of the second tube portion is preferably within a range of 20.0 mm to 60.0 mm, for example. When the inner diameter of the cylindrical portion of the second tube portion is 20 mm or more, for example, collisions between the sample droplets in the gas flow introduced through the sample introduction port portion can be effectively suppressed, and as a result, droplet loss caused by collisions between the droplets can be reduced. Further, the inner diameter of the cylindrical portion of the second tube portion is preferably 60 mm or less, for example, in order to reduce the size of the second tube portion and also reduce the size of the spray chamber.

The second tube portion includes the cylindrical portion and the sample introduction port portion, and preferably consists of the cylindrical portion and the sample introduction port portion. In the embodiment shown in FIG. 3C, an angle θ2 formed by the central axis direction of the sample introduction port portion 121 (the Z direction) and the central axis direction of the cylindrical portion of the first tube portion (the Y direction) is 30°. In the embodiment shown in FIG. 4B, on the other hand, the Z direction is the same direction as the Y direction (in other words, the angle θ2 formed by the Z direction and the Y direction=0°). θ2 is prescribed within a range of 0° to 90°. When θ2 is 0° and the gas flow containing the sample droplets is introduced into the spray chamber from a substantially identical direction to the central axis direction of the sample introduction port portion, the sample droplets are less likely to collide with the wall surface of the cylindrical portion of the second tube portion. As a result, wall surface adhesion loss of the droplets in the spray chamber can be reduced even more effectively. Hence, from the viewpoint of further improving the analysis sensitivity, the Z direction and the Y direction are preferably the same direction.

When the Z direction is inclined relative to the Y direction, on the other hand, and the gas flow containing the sample droplets is introduced into the spray chamber from a substantially identical direction to the central axis direction of the sample introduction port portion, at least some of the sample droplets are likely to collide with the wall surface of the cylindrical portion of the second tube portion. When the sample droplets collide with the wall surface of the cylindrical portion of the second tube portion, the droplets can be smashed into finer droplets by the collision, and therefore the droplets discharged from the spray chamber tend to be finer. Finer sample droplets are preferable for stabilizing the sensitivity of the analysis unit of the analysis device. Therefore, when emphasizing stability, the Z direction is preferably inclined relative to the Y direction, and in this case, θ2 is preferably set within a range of 10° to 60°, for example.

In the spray chamber described above, the length of the cylindrical portion of the second tube portion is preferably between 10.0 and 70.0 mm, for example. At least a part of the cylindrical portion forms the double tube portion, and the above length also includes the length of the part forming the double tube portion. As illustrated by the embodiment shown in FIGS. 2B and 3C, for example, it is possible for the cylindrical portion of the second tube portion to be non-perfectly cylindrical shape. The bottom surface portion thereof on the sample introduction port portion side can be inclined relative to the central axis direction of the cylindrical portion of the second tube portion. In this case, the length of the cylindrical portion is the shortest length (l in FIG. 3C, for example).

In the spray chamber described above, there are no particular limitations on the shape and length of the discharge port portion of the first tube portion, as long as the discharge port portion includes an opening serving as a discharge port. The tip end of the discharge port portion normally serves as a connecting part connected to the analysis unit of the analysis device, and therefore the tip end shape can be determined in accordance with the shape of the analysis unit.

Meanwhile, there are no particular limitations on the shape and length of the sample introduction port portion of the second tube portion, as long as the sample introduction port portion includes an opening for introducing the gas flow containing the sample droplets from the nebulizer. The sample introduction port portion normally serves as an insertion port portion into which the tip end of the nebulizer is inserted. The sample introduction port portion may have a cylindrical shape, for example, but as noted above, there are no particular limitations on the shape thereof.

As regards the overall length of the spray chamber, generally, droplet loss in the spray chamber tends to become more easily reducible as the overall length decreases, while the ability to sort particle sizes tends to improve as the overall length increases. In consideration of these factors, the overall length of the spray chamber is preferably within a range of 80.0 mm to 200.0 mm, for example. The overall length of the spray chamber is the shortest distance from one furthest end portion to the other furthest end portion when the spray chamber is seen from the side. This corresponds to a length L in FIG. 3C and a length L in FIG. 4B, for example.

With the spray chamber described above, the additional gas can be introduced from the double tube portion, and as a result, wall surface adhesion loss of the sample droplets can be reduced. However, when the sample droplets are subjected to particle size sorting using gravity differences in the spray chamber, a part of the sample liquid introduced in the form of droplets may remain in the spray chamber rather than being discharged from the spray chamber. Further, a part of the sample liquid introduced in the form of droplets may remain in the spray chamber due to wall surface adhesion. The above spray chamber preferably includes at least one waste liquid passage for discharging remaining waste sample liquid to the outside. For example, a waste liquid passage for discharging sample liquid remaining in the first tube portion can be provided in a desired position in the first tube portion, and in one embodiment, the waste liquid passage can be provided in the part forming the double tube portion. In other words, in the spray chamber described above, the outside side face of the double tube portion can be provided with a waste liquid opening and a waste liquid tube portion serving as a waste liquid passage for discharging waste liquid to the outside from the double tube portion through the waste liquid opening (for example, the waste liquid tube portion 113 in FIG. 2B). In addition, the outside side face of the second tube portion can be provided with a waste liquid opening for discharging waste sample liquid remaining in the second tube portion and a waste liquid tube portion serving as a waste liquid passage for discharging the waste liquid to the outside from the second tube portion through the waste liquid opening (for example, the waste liquid tube portion 122 in FIG. 2B).

In the present invention and the specification, the term "cylindrical" used in relation to the cylindrical portion is not limited to meaning a perfectly cylindrical shape, and as noted above, includes embodiments in which a part having a different inner diameter is provided on the end portion connected to the part having the cylindrical shape. As noted above, the term "conical" used in relation to the conical portion is not limited to meaning a perfectly conical shape. Moreover, the term "substantially identical" used to refer to a positional relationship between two directions or the sizes of two diameters is used with the meaning of including a generally allowable error range in addition to a perfectly identical state. This error range denotes a range not exceeding 0.1°, for example, in relation to a positional relationship between two directions and a range not exceeding 1%, for example, in relation to the sizes of two diameters.

The first tube portion and the second tube portion described above can be members formed from any desired material. From the viewpoint of chemical durability, such as acid resistance and alkali resistance, various types of glass, quartz, fluorine resin, various types of resins classified as engineering plastics or super engineering plastics, and so on are preferably used as this material. Various types of fluorine resins, such as polytetrafluoroethylene, can be exemplified as fluorine resins. Various types of engineering plastics, such as polycarbonate (PC), can be exemplified as engineering plastics, and various types of super engineering plastics, such as polyether ether ketone (PEEK), can be exemplified as super engineering plastics. Further, the first tube portion and the second tube portion can be members having a single tube structure. The first tube portion and the second tube portion can be manufactured using a well-known molding method.

[Sample Atomization and Introduction Device]

One aspect of the present invention relates to a sample atomization and introduction device including the spray chamber described above and a nebulizer.

Well-known techniques relating to sample atomization and introduction devices can be applied without limitation to the sample atomization and introduction device described above, with the exception that the spray chamber is constituted by the spray chamber according to one aspect of the present invention. A well-known nebulizer capable of generating a gas flow containing sample droplets by atomizing a sample liquid can be used as the nebulizer.

The above sample atomization device can be used favorably to atomize a sample liquid and introduce the atomized sample liquid into various types of analysis devices. With the above sample atomization device, a higher sample introduction efficiency than that of a conventional sample atomization device can be achieved, thereby contributing to an improvement in the analysis sensitivity of the analysis device.

[Analysis Device]

One aspect of the present invention relates to an analysis device including the sample atomization and introduction device according to one aspect of the present invention and an analysis unit.

In the embodiment aspect shown in FIG. 1, the inlet portion 14 of the plasma torch is the part of the analysis unit that is positioned closest toward the side of the sample atomization and introduction device. The plasma torch is the part of the analysis device described above that performs ionization using plasma, for example, examples of the analysis device including an Inductively Coupled Plasma-Mass Spectrometer (an ICP-MS) and an Inductively Coupled Plasma-Atomic Emission Spectrometer (an ICP-AES).

As regards an angle at which the sample atomization and introduction device is arranged within the analysis device, an angle θ3 formed by a horizontal direction (an H direction in FIG. 1) of an arrangement surface on which the sample atomization and introduction device is arranged and the central axis direction (the Y direction in FIG. 1) of the cylindrical portion of the first tube portion of the spray chamber is preferably within a range of 0° to 90° (i.e. from parallel to the horizontal direction of the arrangement surface to perpendicular to the horizontal direction of the arrangement surface). Thus, droplets having a large particle size, among the sample droplets introduced into the spray chamber from the nebulizer, can be caused to fall by gravity, leading to an improvement in the particle size sorting ability by which particle sizes are sorted. Note that the angle θ3 is prescribed within a range of 0° to ±90°. When θ3 takes a negative value, the spray chamber is arranged so that the first tube portion is in a lower position than the second tube portion. Further, at least one waste liquid opening for discharging waste sample liquid remaining in the discharge port portion of the spray chamber can be provided in a desired position in the outside side face of the discharge port portion. When θ3 takes a negative value, the waste liquid opening is preferably provided in the outside side face of the discharge port portion of the spray chamber.

From the viewpoint of improving both the sample introduction efficiency into the analysis unit and the particle size sorting ability, the angle θ3 is preferably within a range of 20° to 90°, more preferably within a range of 20° to 70°, even more preferably within a range of 20° to 50°, and yet more preferably within a range of 20° to 30°.

The analysis device can be any of various analysis devices requiring that a sample liquid be introduced therein in the form of fine droplets. An inductively coupled plasma analysis device can be exemplified as this type of analysis device. In an inductively coupled plasma analysis device, a plasma torch is provided in the part of the analysis unit closest to the side of the sample atomization and introduction device. An analysis subject sample contained in the sample droplets introduced into the plasma torch is ionized by plasma generated at the tip end of the plasma torch. Specific examples of inductively coupled plasma analysis devices include an ICP-MS, an ICP-AES, and so on. In the case of an ICP-MS, for example, ions generated by the above ionization are introduced into a mass spectrometer, whereupon the ions are sorted according to mass by the mass spectrometer and detected by an ion detector. Qualitative analysis can be implemented on the basis of the mass of the ions detected by the ion detector, and quantitative analysis can be implemented on the basis of signal intensities of the ions of the respective masses. Generally, the signal intensity (the analysis sensitivity) increases as the amount of sample introduced from the sample atomization and introduction device increases. With the sample atomization and introduction device according to one aspect of the present invention, the sample introduction efficiency can be improved in comparison with a conventional sample atomization and introduction device, and therefore an improvement in the analysis sensitivity can be achieved. Furthermore, in various types of analysis devices other than an ICP-MS, such as an ICP-AES, an increase in the sample introduction efficiency can contribute to an improvement in the analysis sensitivity, and therefore the sample atomization and introduction device according to one aspect of the present invention can be used favorably therein.

[Component Analysis Method]

One aspect of the present invention relates to a method of analyzing a component in a sample liquid, which includes:

analyzing a component in an analysis subject sample liquid with the analysis device according to one aspect of the present invention, and further includes:

introducing an additional gas from the additional gas introduction tube portion when the gas flow containing droplets of the sample liquid that has been atomized by the nebulizer flows through the flow passage tube portion of the spray chamber.

The above component analysis method will be described in further detail below.

Details of the analysis device used in the above component analysis method are as described above. The analysis subject sample liquid is introduced into the sample atomization device of the analysis device and atomized in the nebulizer, then flows into the flow passage tube portion of the spray chamber, and is then introduced into the analysis unit and subjected to component analysis.

In the nebulizer, a gas flow containing sample droplets can be generated (the sample can be atomized) by mixing the sample liquid with a carrier gas and spraying the result. One or two or more types of inert gas are typically used as the carrier gas. Argon gas, for example, can be exemplified as a specific example of the carrier gas. A well-known technique can be applied without limitation to atomization of the sample in the nebulizer.

The gas flow containing the sample droplets atomized by the nebulizer is introduced into the spray chamber according to one aspect of the present invention and flows through the flow passage tube portion of the spray chamber. The carrier gas flow rate and the amount of sample droplets (the spray amount) atomized by the nebulizer and introduced into the spray chamber can be set in consideration of the size of the spray chamber and so on. As an example, the carrier gas flow rate can be set at 0.5 to 1.2 L/min, for example, and the amount of sample droplets (the spray amount) atomized and sprayed by the nebulizer can be set at 25 to 100 µL/min, for example. Note that the carrier gas flow rate and the amount of sample droplets can be set as appropriate in consideration of the types of components (the types of elements, for example) contained in the analysis subject sample liquid and are not therefore limited to the above ranges. In the above component analysis method, when the gas flow containing the sample droplets flows through the flow passage tube portion, the additional gas is introduced through the additional gas introduction tube portion. As a result, as described above, the introduced additional gas can swirl around the double tube portion and can generate a spiral-shaped gas flow (the additional gas flow) that travels toward the conical portion of the first tube portion. The various gases exemplified as examples of the carrier gas, for example, can be used as the additional gas. The additional gas can be introduced into the double tube portion from an additional gas supply source through the additional gas introduction tube portion and the additional gas introduction opening by connecting the gas supply source to the additional gas introduction tube portion using a tube such as a resin tube. From the viewpoint of durability, a tube made of a fluorine resin such as polytetrafluoroethylene is preferably used as the resin tube. The additional gas flow rate can be set within a range of 0.3 to 0.5 L/min, for example, but is preferably set as appropriate in consideration of the width of the space in the double tube portion into which the additional gas is introduced, the size of the conical portion, and so on, and is not therefore limited to the above range. The gas flow containing the sample droplets that is discharged from the discharge port portion of the spray chamber is introduced into the analysis unit of the analysis device and subjected to qualitative and/or quantitative analysis. Details of specific examples of the analysis unit and so on are as described above in relation to the analysis device according to one aspect of the present invention. Various metallic components such as heavy metals, non-metallic components, and so on can be exemplified as examples of analysis subject components.

With the component analysis method according to one aspect of the present invention, as described above, an improvement in analysis sensitivity can be achieved in comparison with a conventional component analysis method. The present inventors assume that this improvement is brought about by an improvement in the sample introduction efficiency into the analysis unit of the analysis device, which is realized by enabling a reduction in wall surface adhesion loss of the sample droplets in the spray chamber. Such improvement in analysis sensitivity is desirable in component analysis in various fields. As an example, with respect to various types of silicon samples, such as various silicon wafers used as semiconductor substrates or the like and single crystal ingots for cutting out silicon wafers, for example, the metallic components of the silicon sample are analyzed, whereupon the existence and/or extent of metal impurity contamination are evaluated. Metal impurity contamination causes device defects in semiconductor devices, and it is therefore desirable to ascertain the existence and/or extent of metal impurity contamination and reduce the metal impurity contamination by excluding silicon wafers contaminated with metal impurities as defective products, modifying manufacturing conditions, and replacing or repairing the manufacturing device. In recent years, with improvements in the performance and so on of devices, an increased level of quality is required for semiconductor substrates. To respond to such requirement, it is desirable to reduce the metal impurity contamination of the silicon sample, even when the contamination exists in only a minute amount. To evaluate the existence and/or extent of such minute amount of metal impurity contamination with a high degree of precision, a high level of sensitivity is required for the analysis device. Regarding this point, an improvement in analysis sensitivity can be achieved with the analysis device according to one aspect of the present invention. Therefore, the component analysis method according to one aspect of the present invention, which employs this analysis device, can be applied favorably as a method of analyzing the metallic components of various types of silicon samples. By employing the above component analysis method, even when the amount of metal impurity contamination of the silicon sample is minute, qualitative analysis and/or quantitative analysis of the metallic components can be performed with a high degree of sensitivity. To evaluate the metal impurity contamination of the silicon sample, a sample liquid obtained by dissolving all or a part of the evaluation subject silicon sample or a sample liquid obtained by scanning the surface of the silicon sample with a recovery liquid such as an acid solution so that metallic components adhered to the surface are picked up by the recovery liquid can be introduced into a nebulizer and subjected to metallic component analysis after undergoing pretreatment, such as dilution in an acid solution or the like, as required. The existence and/or extent of various types of metal impurity contamination, such as surface layer portion metal impurity contamination, bulk metal impurity contamination, and surface metal impurity contamination, of the silicon sample can then be evaluated from the obtained analysis results.

However, the present invention is not limited to evaluation of the metal impurity contamination of a silicon sample and can be applied to component analysis in various fields, and by applying the present invention, an improvement in analysis sensitivity can be achieved.

EXAMPLES

The present invention will be described further using examples below. However, the present invention is not limited to the embodiments illustrated in the examples.

In the following examples, gas was introduced by connecting a polytetrafluoroethylene tube to the additional gas introduction tube portion of the spray chamber, and waste liquid was discharged by connecting a polyvinyl chloride tube to the waste liquid tube portion. Further, the first tube portion and the second tube portion of the spray chamber used in the examples described below were made of glass.

Example 1

An ICP-MS of Example 1 was prepared by modifying the spray chamber of a commercially available ICP-MS to the spray chamber of the embodiment shown in FIGS. 4A and 4B, with the exception that θ1 was set at θ1=90°. In the ICP-MS of Example 1, θ1=90°, θ2=0°, θ3=30°, the maximum inner diameter of the conical portion of the first tube portion was set at 45.0 mm, the ratio (length/maximum inner diameter) of the length of the conical portion to the maximum inner diameter of the conical portion was set at 0.5, the length of the double tube portion was set at 20.0 mm, the diameter of the additional gas introduction opening, as well as the waste liquid openings in the double tube portion and the second tube portion, was set at 3.0 mm, the inner diameter (the maximum inner diameter) of the cylindrical portion of the first tube portion was set at 45.0 mm, the outer diameter of the cylindrical portion of the second tube portion was set at 42.0 mm, and the overall length of the spray chamber was set at 130.0 mm.

In the ICP-MS of Example 1, analysis was performed on a 0.5 N nitric acid solution containing 0.2 ppb (volume basis) of $^{115}$In (the sample liquid). A gas flow containing sample droplets was generated by atomizing the sample liquid in the nebulizer using a carrier gas (argon gas; flow rate 0.75 L/min), whereupon the gas flow containing the sample droplets was introduced into the flow passage tube portion of the spray chamber (sample droplet amount (spray amount): 100 μL/min) through the sample introduction tube portion of the spray chamber. While the gas flow passed through the flow passage tube portion, argon gas was introduced continuously into the double tube portion from the additional gas introduction tube portion through the additional gas introduction opening at a flow rate of approximately 0.4 L/min as the additional gas. Analysis was performed 10 times, and the arithmetic mean of the signal intensity of the In ions obtained in each of the 10 analyses was determined.

For comparison, as Comparative Example 1, the sample liquid described above was analyzed 10 times using a similar method to Example 1, with the exception that the Scott-type spray chamber (the Scott-type double pass spray chamber) of the embodiment shown in FIG. 5 was used as the spray chamber, and the arithmetic mean of the signal intensity of the In ions obtained in each of the 10 analyses was determined. The signal intensity of the In ions (the arithmetic mean) obtained in Comparative Example 1 was then set at 1.0, whereupon the signal intensity of the In ions (the arithmetic mean) obtained by analysis using the ICP-MS of Example 1 was determined as a relative value relative to Comparative Example 1. The resulting value is shown in Table 1.

Examples 2 to 4

ICP-MSs of Examples 2 to 4 were prepared in a similar manner to Example 1, with the exception that the ratio (length/maximum inner diameter) of the length of the conical portion to the maximum inner diameter of the conical portion was varied by varying the length of the conical portion. Using the ICP-MSs of Examples 2 to 4, the signal intensities (the arithmetic means) obtained by analyzing the sample liquid in a similar manner to that described above were determined as relative values relative to Comparative Example 1, and the results are shown in Table 1.

TABLE 1

|  | Comparative Example 1 | Example 1 | Example 2 | Example 3 | Example 4 |
| --- | --- | --- | --- | --- | --- |
| Length/maximum inner diameter of conical portion | — | 0.5 | 0.8 | 3.0 | 3.2 |
| Signal intensity (relative value) | 1.0 | 1.7 | 2.0 | 1.9 | 1.9 |

It can be confirmed from the results shown in Table 1 that with the ICP-MSs of Examples 1 to 4, the analysis sensitivity (the signal intensity) can be improved in comparison with the ICP-MS using the conventional spray chamber. The reason for this is assumed to be that while the gas flow containing droplets of the sample liquid flows through the flow passage tube portion of the spray chamber, the additional gas is introduced into the double tube portion of the spray chamber, thereby generating an additional gas flow that swirls around the wall surface in a spiral shape from the double tube portion toward the conical portion of the first tube portion, and as a result, wall surface adhesion loss of the droplets can be reduced.

A standard deviation (variation) in the signal intensities obtained in the 10 analyses was determined for each of Examples 1 to 4. The standard deviation obtained for Example 3 was then set at 1.0, whereupon the standard deviations obtained for the respective examples were determined as relative values relative to Example 3. The results are shown in Table 2.

TABLE 2

|  | Example 1 | Example 2 | Example 3 | Example 4 |
| --- | --- | --- | --- | --- |
| Length/maximum inner diameter of conical portion | 0.5 | 0.8 | 3.0 | 3.2 |
| Variation in signal intensity (relative value) | 2.0 | 1.5 | 1.0 | 0.8 |

When the signal intensities of Examples 1 to 3, shown in Table 1, were compared with the signal intensity of Example 4, it was confirmed that no further improvement in the analysis sensitivity (the signal intensity) was achieved by increasing the ratio (length/maximum inner diameter) of the length to the maximum inner diameter of the conical portion beyond 3.0. Meanwhile, the overall length of the spray chamber increases as this ratio increases, and therefore, in order to realize both a reduction in the size of the spray chamber and an improvement in analysis sensitivity, it can be said, on the basis of the results shown in Table 1, that the ratio is preferably 3.0 or less.

Meanwhile, variation in the signal intensity, shown in Table 2, decreases as the ratio (length/maximum inner diameter) of the length to the maximum inner diameter of the conical portion increases. Note that in Example 1, a minute amount of droplet adhesion to the wall surface of the conical portion was confirmed, whereas such droplet adhesion was not confirmed in Examples 2 to 4.

From the viewpoint of improving the reliability of the analysis results, variation in the analysis sensitivity (the signal intensity) is preferably small. In order to reduce variation in the analysis sensitivity (the signal intensity) further, it can be said, on the basis of the results shown in Table 2, that the ratio (length/maximum inner diameter) of the length to the maximum inner diameter of the conical portion is preferably 0.8 or more.

Examples 5 to 8

ICP-MSs were prepared in a similar manner to Example 1, with the exception that θ1 and/or the length of the double tube portion were modified as shown in Table 3, and the sample liquid was analyzed.

The signal intensity (the arithmetic mean of 10 analyses) obtained from each of the examples was determined as a relative value relative to Comparative Example 1, similarly to Example 1, and the results are shown in Table 3. As shown in Table 3, the signal intensity (relative value) exceeded 1.0 in Examples 5 to 8, thereby confirming that the analysis sensitivity (the signal intensity) can be improved in comparison with that of the ICP-MS using the conventional spray chamber (Comparative Example 1). Note that in Example 8, a minute amount of droplet adhesion to the wall surface of the conical portion was confirmed, whereas such droplet adhesion was not confirmed in Examples 5 to 7.

TABLE 3

|  | Comparative Example 1 | Example 5 | Example 6 | Example 7 | Example 8 |
| --- | --- | --- | --- | --- | --- |
| Length of double tube portion | — | 10.0 mm | 30.0 mm | 20.0 mm | 20.0 mm |
| θ1 | — | 90° | 90° | 110° | 130° |
| Signal intensity (relative value) | 1.0 | 1.1 | 1.1 | 1.3 | 1.1 |

Example 9

An ICP-MS of Example 9 was prepared by modifying the spray chamber of a commercially available ICP-MS to the spray chamber of the embodiment shown in FIGS. 1 to 3C. In the ICP-MS of Example 9, θ1=90°, θ2=10°, θ3=30°, the maximum inner diameter of the conical portion of the first tube portion was set at 50.0 mm, the ratio (length/maximum inner diameter) of the length of the conical portion to the maximum inner diameter of the conical portion was set at 0.5, the length of the double tube portion was set at 20.0 mm, the diameter of the additional gas introduction opening, as well as the waste liquid openings in the double tube portion and the second tube portion, was set at 3.0 mm, the inner diameter (the maximum inner diameter) of the cylindrical portion of the first tube portion was set at 45.0 mm, the outer diameter of the cylindrical portion of the second tube portion was set at 42.0 mm, and the overall length of the spray chamber was set at 130.0 mm.

Using the ICP-MS of Example 9, the signal intensity obtained by analyzing the sample liquid in a similar manner to Example 1 was determined as a relative value relative to Comparative Example 1, similarly to Example 1. The result is shown in Table 4.

Further, variation in the signal intensity (a relative value relative to Example 3) of Example 9 was determined in a similar manner to that described above.

Example 10

An ICP-MS of Example 10 was prepared in a similar manner to Example 9, with the exception that θ2 was set at θ2=45°.

Using the ICP-MS of Example 10, the signal intensity obtained by analyzing the sample liquid in a similar manner to Example 1 was determined as a relative value relative to Comparative Example 1, similarly to Example 1. The result is shown in Table 4.

Further, variation in the signal intensity (a relative value relative to Example 3) of Example 10 was determined in a similar manner to that described above.

Example 11

An ICP-MS of Example 11 was prepared in a similar manner to Example 9, with the exception that θ2 was set at θ2=60°.

Using the ICP-MS of Example 11, the signal intensity obtained by analyzing the sample liquid in a similar manner to Example 1 was determined as a relative value relative to Comparative Example 1, similarly to example 1. The result is shown in Table 4.

Further, variation in the signal intensity (a relative value relative to Example 3) of Example 11 was determined in a similar manner to that described above.

The results obtained for Example 2 are also shown in Table 4.

TABLE 4

|  | Comparative Example 1 | Example 2 | Example 9 | Example 10 | Example 11 |
| --- | --- | --- | --- | --- | --- |
| θ2 | — | 0° | 10° | 45° | 60° |
| Signal intensity (relative value) | 1.0 | 2.0 | 1.7 | 1.3 | 1.1 |
| Variation in signal intensity (relative value) | — | 1.5 | 1.2 | 0.8 | 0.5 |

As shown in Table 4, in Examples 9 to 11, the signal intensity (relative value) exceeds 1.0, thereby confirming that the analysis sensitivity (the signal intensity) can be improved in comparison with that of the ICP-MS using the conventional spray chamber (Comparative Example 1).

Further, it was confirmed from a comparison of Example 2 with Examples 9 to 11 that variation in the signal intensity was smaller in Examples 9 to 11 than in Example 2.

From the above results, it can be said that if a further improvement in the signal intensity is to be prioritized, θ2 is preferably between 0° and 10°, and if achieving both an improvement in signal intensity and a reduction in signal intensity variation is to be prioritized, θ2 is preferably within a range of 10° to 60°.

From the above results, it can be confirmed that according to one aspect of the present invention, an improvement in analysis sensitivity can be achieved, and according to one aspect of the present invention, an improvement in analysis sensitivity can be achieved while reducing variation in the analysis sensitivity.

The invention claimed is:

1. A spray chamber, which comprises:
   a sample introduction port portion into which a gas flow containing sample droplets that have been atomized by a nebulizer is introduced;
   a discharge port portion that discharges at least a part of the gas flow introduced into the sample introduction port portion to an outside thereof; and
   a flow passage tube portion that has the sample introduction port portion on one end portion thereof and the discharge port portion on the other end portion thereof and serves as a flow passage for the introduced gas flow,
   wherein the flow passage tube portion comprises a first tube portion having the discharge port portion on one end portion thereof and a second tube portion having the sample introduction port portion on one end portion thereof,
   the first tube portion comprises a cylindrical portion that comprises an opposite end portion to the end portion having the discharge port portion, and a conical portion with an inner diameter that decreases gradually toward a side of the discharge port portion,
   the second tube portion comprises a cylindrical portion that comprises an opposite end portion to the end portion having the sample introduction port portion, an outer diameter of the cylindrical portion of the second tube portion being smaller than an inner diameter of the cylindrical portion of the first tube portion,
   the spray chamber comprises a double tube portion formed by overlapping at least a part of the cylindrical portion of the first tube portion and the cylindrical portion of the second tube portion, and
   an outside side face of the double tube portion is provided with an additional gas introduction opening and only one additional gas introduction tube portion that serves as an introduction passage for introducing an additional gas into the double tube portion through the additional gas introduction,
   wherein a line extended along a central axis of the additional gas introduction tube portion does not intersect with a line extended along a central axis of the first tube portion.

2. The spray chamber according to claim 1, wherein an angle formed by a central axis direction of the additional gas introduction tube portion and a central axis direction of the cylindrical portion of the first tube portion ranges from 90° to 130°.

3. The spray chamber according to claim 1, wherein the additional gas introduction opening is positioned in a position on the outside side face of the double tube portion closer to the inlet end of the first tube portion than the outlet end of the second tube portion.

4. The spray chamber according to claim 1, wherein a length of the double tube portion ranges from 10.0 mm to 30 mm.

5. The spray chamber according to claim 1, wherein a difference between the inner diameter of the cylindrical portion of the first tube portion and the outer diameter of the cylindrical portion of the second tube portion ranges from 1.0 mm to 6.0 mm.

6. The spray chamber according to claim 1, wherein a ratio, length/maximum inner diameter, of a length of the conical portion of the first tube portion to a maximum inner diameter of the conical portion ranges from 0.5 to 3.0.

7. The spray chamber according to claim 1, wherein an overall length of the spray chamber ranges from 80.0 mm to 200.0 mm.

8. The spray chamber according to claim 1, wherein an angle formed between a central axis direction of the sample introduction port portion and a central axis direction of the cylindrical portion of the first tube portion ranges from 10° to 60°.

9. The spray chamber according to claim 1, wherein a central axis direction of the sample introduction port portion and a central axis direction of the cylindrical portion of the first tube portion are identical directions.

10. The spray chamber according to claim 1, wherein the first tube portion and the second tube portion are members made of glass, quartz, or a fluorine resin.

11. The spray chamber according to claim 1, wherein the outside side face of the double tube portion is provided with a waste liquid opening and a waste liquid tube portion that serves as a waste liquid passage for discharging waste liquid from an inside of the double tube portion to an outside of the double tube portion through the waste liquid opening.

12. A sample atomization and introduction device, which comprises a spray chamber and a nebulizer, wherein the spray chamber is the spray chamber according to claim 1.

13. An analysis device, which comprises the sample atomization and introduction device according to claim 12 and an analysis unit.

14. The analysis device according to claim 13, wherein an angle formed by a horizontal direction of an arrangement surface on which the sample atomization and introduction device is arranged and a central axis direction of the cylindrical portion of the first tube portion of the spray chamber ranges from 20° to 90°.

15. The analysis device according to claim 13, which is an inductively coupled plasma analysis device, and the analysis unit comprises a plasma torch.

16. The analysis device according to claim 15, which is an inductively coupled plasma mass spectrometry device.

17. A method of analyzing a component in a sample liquid, which comprises:
   analyzing a component in an analysis subject sample liquid with the analysis device according to claim 14, and further comprises:

introducing an additional gas from the additional gas introduction tube portion when a gas flow containing droplets of the sample liquid atomized by the nebulizer flows through the flow passage t